*INVENTOR.*
R. E. DOLLINGER

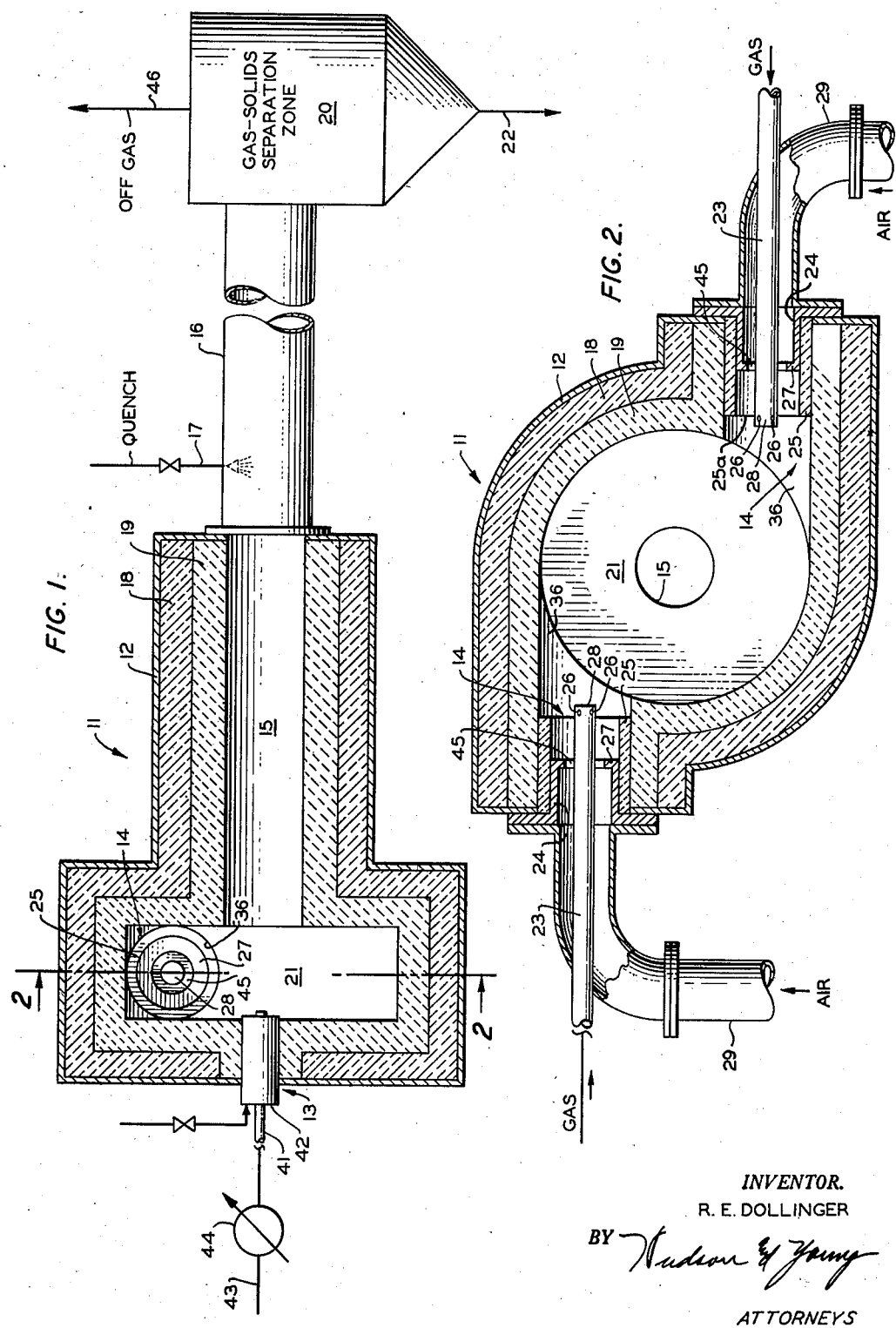

*ATTORNEYS*

United States Patent Office 2,890,746
Patented June 16, 1959

2,890,746

NON PREMIX BURNER FOR PRODUCING CARBON BLACK

Robert E. Dollinger, Phillips, Tex., assignor to Phillips Petroleum Company, a corporation of Delaware Application January 3, 1955, Serial No. 479,308

5 Claims. (Cl. 158—7)

This invention relates to the production of carbon black. In one aspect it relates to an improved non-premix burner for use in conjunction with a carbon black furnace. In another aspect it relates to a burner for use in conjunction with a carbon black furnace, wherein the burner is effectively operated with air under an unusually low pressure even at relatively high throughputs.

It is known in the art to produce carbon black by non-catalytic reaction of a hydrocarbon at high temperature by virtue of heat imparted to said hydrocarbon from a hot combustion gas. Such a process is described in U. S. Patent 2,564,700 to Krejci (1951). The process utilizes a reactor comprising a precombustion zone positioned coaxially with and in open communication with a reaction zone of smaller diameter than that of the precombustion zone. A fuel and a free-oxygen containing gas in combustible proportions are introduced, at a high velocity, into a tunnel in which combustion takes place. Combustion is substantially completed in the tunnel and the resulting products then pass tangentially into the precombustion zone. In this zone the hot gases spiral inward until the spiral is smaller in diameter than the reaction zone. The hot gases then follow a generally helical path through the reaction zone. A reactant capable of being converted to carbon black is introduced axially into the precombustion zone and is reacted in the reaction zone by heat directly imparted thereto by the gases of combustion.

One object of my invention is to provide a suitable burner for supplying heat to a carbon black production furnace.

Another object of my invention is to provide a burner for supplying heat to a carbon black production furnace adapted to the production of high quality carbon black.

Still another object of my invention is to provide an improved nonpremix burner for such a carbon black production furnace.

Yet another object of my invention is to provide improved burners for supplying heat to carbon black production furnaces, which burners ar adapted to operate at air pressures lower than those required for conventional burners, the lower air pressures contributing to lower capital investment and lower operating costs.

Still other objects and advantages will be realized upon reading the following description, which taken with the attached drawing, forms a part of this specification.

This invention provides an apparatus and a method for its operation whereby combustion of the tangentially added fuel gas is effected in a manner such that the burner does not vibrate and the combustion proceeds very smoothly, requiring an unusually low pressure of the free-oxygen containing gas. Prior art processes employ burners requiring pressures of from eight inches or more of mercury while the burner of my invention utilizes air pressure as low as 5.5 inches of mercury and even lower and yet provides smooth and efficient combustion.

The burner assembly of my invention includes a small diameter closed end tube with 2 to 4 openings spaced around the circumference near the closed end. Disposed coaxially therewith and surrounding this small diameter tube is a ceramic sleeve and/or another tube with a constricting orifice at its end. When both the sleeve and orifice containing tube are used the ceramic sleeve surrounds the tube. This assembly is mounted in a tunnel of circular cross section in such a manner that fuel gas and air introduced respectively through the small diameter tube and the orifice containing tube enter as combustion gases a large diameter section of furnace and the combustion gases follow a spiral path toward the axis of the furnace. The small diameter tube, herein termed a bayonet tube, is so positioned along the axis of said tunnel in such a manner that its holes are positioned within about 2 inches, preferably within 1 inch of one of the furnace end of the ceramic sleeve and the orifice of the orifice containing tube. In general the furnace end of the ceramic tube is about 3 inches closer to the furnace than is the orifice of the orifice containing tube. The wall of the tunnel containing the above described assembly of tubes and sleeve also serves as a tube and is a necessary element of the burner because fuel gas flowing at a high velocity from the holes in the bayonet tube may impinge against the tunnel wall thereby promoting mixing of fuel gas and air.

My invention also embodies a process for producing carbon black in which the burner assembly of my invention is used for introducing fuel and free-oxygen containing gas into a large diameter combustion zone wherein an only relatively small pressure is required to supply sufficient air for operation of the furnace.

In the drawing, Figure 1 is a longitudinal view, partly in section, of a carbon black production furnace utilizing my tangential burners.

Figure 2 is a sectional view taken along the line 2—2 of Figure 1.

Figure 1 illustrates an apparatus, in general, the operation of which is described in Patent 2,564,700, mentioned hereinabove, and illustrates one embodiment of my burner used in connection with such a furnace. The process described in the cited patent is known as a tangential flame process of the precombustion type.

Figure 3:
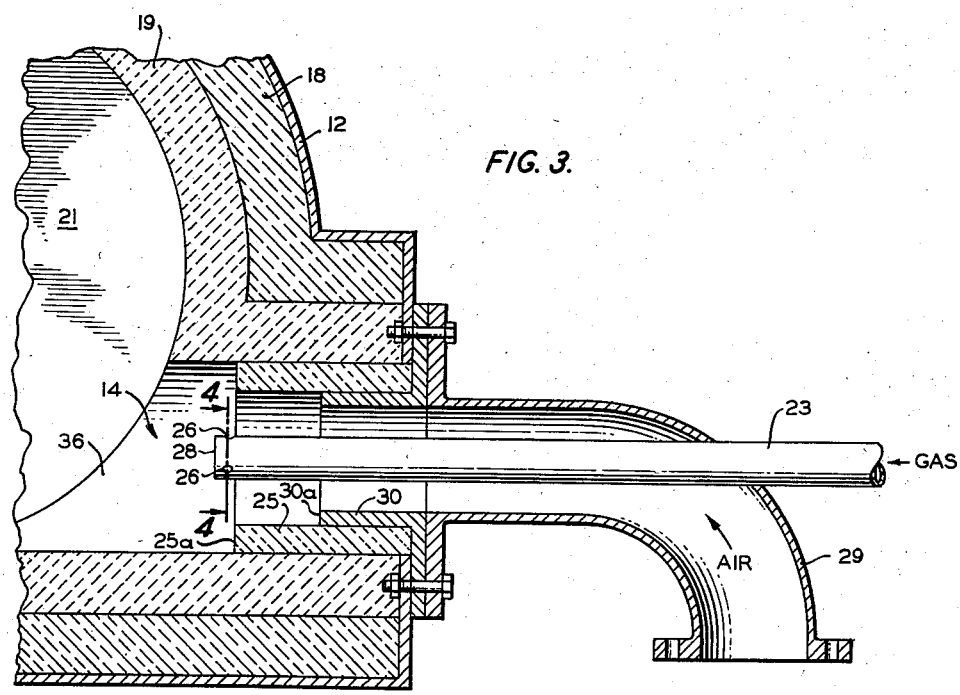
Figure 3 is an enlarged sectional view illustrating another embodiment of my burner.

There are two general types of burners for introducing fuel and free-oxygen containing gas tangentially into such a combustion zone as that illustrated in Figure 1. One type of burner is known as a "premix" burner and a premix burner is so constructed that the fuel and free-oxygen containing gas are thoroughly mixed before these gases reach the point at which combustion is initiated and the flame stabilized. The second type, known as a "non-premix" type burner, is one in which the fuel and free-oxygen-containing gas are mixed at the point at which combustion is initiated and the flame stabilized.

The burners of my invention are of the second, that is, the non-premix type and the fuel and free-oxygen containing gas are mixed after these materials leave the burner.

Referring now to the drawings and specifically to

Figure 1, a carbon black production furnace 11 comprises a precombustion zone 21 which has a diameter greater than its length, and a reaction zone 15 which has a smaller diameter than that of the precombustion zone and a length greater than its diameter. These two chambers are disposed along a common axis and are in communication with each other. The furnace is enclosed by a steel shell 12, containing a ceramic refractory 19 which defines the precombustion zone 21 and the reaction zone 15. The space intermediate this ceramic refractory 19 and the steel shell 12 is packed with suitable insulating material 18. A reactant hydrocarbon feed inlet tube 41 is surrounded by an air jacket 42 and this assembly identified by reference numeral 13, is disposed in the furnace as illustrated. This feed assembly 13, the precombustion zone 21 and the reaction zone 15 are disposed coaxially. A reactant, which is usually a liquid hydrocarbon and preferably an aromatic gas oil, but may be liquid, vapor, or a mixture thereof, enters the system through inlet 43 and is preheated, and preferably vaporized in a heater 44. The heated and vaporized oil passes to the axially positioned feed line 41 and is injected axially into the furnace 11. A small amount of air enters through air inlet 42 which surrounds the oil inlet 41. Only sufficient air is added at this point to prevent deposition of carbon around the outlet of the oil injector tube 41 and to protect the outlet from the high temperature in the precombustion zone.

Reference numeral 14 identifies the burner assembly disposed to inject fuel and air tangentially into the precombustion zone 21.

Simultaneously, as shown in Figure 2, air is injected into the burner through air inlet 29 and fuel, such as a natural gas, is injected through a tube 23 and the hot combustion products are then introduced tangentially into the precombustion zone through tangential inlets or tunnels 36. Positioned within each of said tunnels is a burner according to this invention. The burner as illustrated in Figure 2 comprises an air inlet tube 24 and the above-mentioned gas inlet tube 23 positioned coaxially within tube 24. A ceramic sleeve 25 is preferably provided intermediate the tube 23 (and tube 24) and the walls of tunnel 36. This sleeve terminates at a point near openings 26 in tube 23. The openings 26 in the bayonet tube 23 should be within 2 inches, preferably within 1 inch of either the step hereinafter described, or the orifice 45. The tube 24 is provided with an orifice plate 27 on the outlet end thereof, the orifice plate having a relatively large diameter opening 45. The downstream end of tube 23 is closed with a cap 28 and at a point near cap 28 is disposed a plurality of circumferentially disposed openings 26, (see Figure 4). The number of openings employed in tube 23 will be from 2 to 4, inclusive, and is preferably three. Fuel gas flows through openings 26 in tube 23 into the air stream but the fuel is by no means completely mixed with the air at this point and produces a turbulent, nonlaminar, flame. The flame is anchored in the turbulent zone produced by the orifice 45 or by the step produced by the end of the ceramic tube 25 adjacent the capped end of tube 23. Combustion is complete, or substantially so, before the gases leave the tunnel 36 and enter the precombustion zone 21. The hot combustion gases proceed from the tunnel 36 spirally toward the axis of precombustion zone 21. The hot gases of combustion then follow a helical path into the reaction zone 15, thus heating the reaction zone to a carbon black-forming temperature. The combustion and reaction products proceed through the reaction zone 15 following a generally helical path. The axially introduced carbon containing oil is noncatalytically reacted in the reaction chamber to form high quality carbon black in high yields. A suspension of carbon in reaction gas passes from reaction zone 15 into a pipe 16. The reaction mixture is preferably initially cooled to a temperature below about 1250° F. by means of water directly injected through quench inlet 17. The so-cooled mixture proceeds through pipe 16 and is further cooled therein, if desired, by exposing an uninsulated section of pipe 16 to the atmosphere or by the use of a water jacket or one or more additional quench inlets, not shown. The cooled mixture of carbon black and reaction gas passes from pipe 16 to a gas-solids separation zone 20, which is one or more cyclone separators, Cottrell precipitators, bag filters or any combination of these or other known equipment for separating solids from gases. Reaction gases are withdrawn from separation zone 30 through an outlet 46 and the carbon black product is withdrawn through an outlet 22.

In Figure 3 of the drawing is illustrated another embodiment of burner in which bayonet tube 23 is the same as the bayonet tube 23 of Figure 2, a difference in Figure 3 being that tube 30 does not have an orifice plate at its outlet end. Omission of this orifice plate decreases the pressure drop through inlet tube 30 and results in slightly less satisfactory operation of the burner unless the inside diameter of the ceramic tube 25 is decreased, and a smaller air inlet tube 30 is needed to give about the same pressure drop as did the orifice. When the orifice is not used, the air inlet tube is not necessary and when not used the air pipe 29 is flanged directly to the furnace. The inner diameter of the ceramic tube is then sufficiently small to give the same pressure drop as did the orifice.

Figure 4:
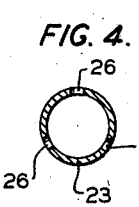
Figure 4 is a cross sectional view taken along the line 4—4 of Figure 3.

Figure 4 illustrates the circumferential arrangement of the three openings 26 of the gas inlet tube 23.

Figure 5:
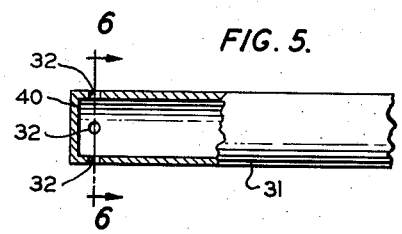
Figure 5 is an elevational view, partly in section, of another embodiment of my invention.
Figure 6:
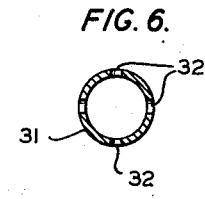
Figure 6 is a cross sectional view taken along the line 6—6 of Figure 5.
Figure 7:
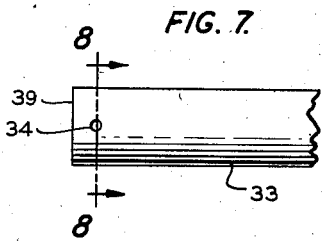
Figure 7 is an elevational view, in part, of another embodiment of my invention.
Figure 8:
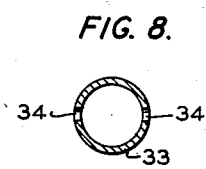
Figure 8 is a cross sectional view taken along the line 8—8 of Figure 7.

I find that under some conditions a gas inlet tube 31, as illustrated in Figures 5 and 6 and having four openings 32 arranged circumferentially and symmetrically around tube 31 at a point near the outlet end, is advantageous. Tube 31 at its outlet end is provided with a gas-tight cap 40. Figures 7 and 8 illustrate still another embodiment of gas inlet tube which tube is identified by reference numeral 33. This tube 33 is provided with two openings 34 disposed circumferentially and symmetrically in the walls of the tube. The outlet end of tube 33 is also provided with a gas-tight cap 39.

The number and size of the openings disposed around the periphery of the gas inlet tube of my burner are so chosen that for 2 to 4 openings the fuel gas emerges therethrough at the velocity of at least 1,000 feet per second calculated at atmospheric pressure. The velocity of the emerging gas can be somewhat greater than 1,000 feet per second the upper limit being determined by the volume of gas to be introduced and its pressure. I have found that with openings 26 of the size to be disclosed hereinafter in a tube 23 of size also to be disclosed, that gas under approximately 12 to 20 pounds gage pressure per square inch gives a gas flow through openings 26 at a velocity somewhat greater than 1000 feet per second. In one instance gas pressure was 14½ p.s.i.g. Gas velocity of at least 1000 feet per second gives a combustion which is smooth and nonvibrating. This 1000 feet per second gas velocity is calculated at atmospheric pressure. In the burner, however, the actual gas velocity is slightly less than 1000 feet per second because the burner tunnel is maintained at a pressure somewhat above atmospheric.

As an illustration of the operation of such a carbon black furnace as herein disclosed employing the burners of my invention are several runs reported in Table I. These several runs were made according to the method described in detail in the above mentioned patent employing a furnace reaction zone 4 inches in diameter and a combustion zone 15 inches in diameter and 4¾ inches in length.

The term "step" as used throughout this specification and claims refers to the end 25a of the ceramic sleeve 25 nearest the precombustion zone 21. Air flowing from pipe 29 through the burner into the precombustion zone becomes somewhat turbulent when passing this step. In addition mixing of fuel gas from the holes 26 with air in the region of this step is found to promote smooth and stable combustion. at atmospheric pressure of the gas emerging from the holes near the outlet end of the gas inlet tube.

TABLE I

*Pilot plant Operating data—4-inch SAF reactor*

| Run No. | Oil Rate, gal./hr. | Tangential [4] | | Jacket Air Rate, c.f.h. | Reactor Temp., F. | Burner Pressure, in. Hg [3] | Photelometer | Est. Pilot Plant Yield, lbs./gal. | Nigrometer |
|---|---|---|---|---|---|---|---|---|---|
| | | Air Rate, c.f.h.[5] | Gas Rate, c.f.h. | | | | | | |
| Reactor Control—Premix Burners with 2¾-inch O.D. Tubing x 1½-inch Orifice | | | | | | | | | |
| 1 [1] | 28.0 | 23,440 | 1,560 | 1,000 | 2,650 | 8.0 | 92 | 2.88 | 82.0 |
| Non-Premix Burner with 2½-inch nps x 1⅝-inch Orifice—Gas admitted through 37/64-inch holes 2⅜-inch downstream of orifice | | | | | | | | | |
| 2 | 28.0 | 23,440 | 1,560 | 1,000 | 2,590 | 6.9 | 92 | 2.79 | 81.2 |
| Reactor Control—Premix Burners with 2¾-inch O.D. Tubing x 1½-inch Orifice | | | | | | | | | |
| 3 [2] | 27.0 | 23,440 | 1,560 | 1,000 | | 8.5 | 92 | 2.53 | 82.0 |
| 4 [2] | 27.1 | 23,440 | 1,560 | 1,000 | 2,590 | | 90 | 2.48 | 82.0 |
| Non-Premix Burners with 2½-inch nps—No Orifice—Gas admitted through 37/64-inch holes 3 inches downstream of end of tube 30 (Fig. 3) | | | | | | | | | |
| 5 [6] | 27.3 | 23,440 | 1,560 | 1,000 | | 4.3 | 93 | 2.52 | 80.4 |
| 6 [6] | 27.3 | 23,440 | 1,560 | 1,000 | 2,560 | | 89 | 2.53 | 80.0 |
| Non-Premix Burners with 2½-inch nps x 1⅝-inch orifice—Gas admitted through 37/64-holes 3 inches downstream of orifice | | | | | | | | | |
| 7 [6] | 27.0 | 23,440 | 1,560 | 1,000 | | 5.2 | 92 | 2.54 | 81.5 |
| 8 [6] | 26.9 | 23,440 | 1,560 | 1,000 | 2,700 | | 91 | 2.59 | 81.0 |

[1] Control for Run No. 2.
[2] Control for Run Nos. 5, 6, 7, and 8.
[3] Pressure at inlet of cooling pipe about 0.3 inch of mercury.
[4] Tangential air and gas for two burners.
[5] Cubic feet per hour.
[6] The step formed by the end of ceramic sleeve 25 was 3 inches from the orifice 45 (runs 7, 8) and 3 inches from the fully open end of tube 30 (Fig. 3); the holes in the bayonet were even with the steps.

Data on additional runs in a 4-inch reactor are given in Table II.

TABLE II

| Run No. | Tangential [1] | | Type Burner | No. of Holes | Velocity of gas, ft./sec. | Burner Pres., in. Hg | Combustion |
|---|---|---|---|---|---|---|---|
| | Air Rate, c.f.h. | Gas Rate, c.f.h. | | | | | |
| 9 | 23,440 | 1,560 | Premix | | | 8.5 | Excellent. |
| 10 | 23,440 | 1,560 | Non-Premix | 8 | 820 | 4.4 | Poor. |
| 11 | 23,440 | 1,560 | do | 8 | 1,260 | Erratic | Do. |
| 12 | 23,440 | 1,560 | do | 3 | 1,120 | 4.3 | Very good. |
| 13 | 23,440 | 1,560 | do | 3 | 430 | Erratic 4.6 | Very poor. |

[1] Tangential gas and air for two burners.

Run 1 was made with a premix tangential burner of the prior art. Runs 2, 7 and 8 were made with burners of the present invention having orifices similar to orifice 45 of Figure 2. Runs 5 and 6 were made using a non-premix burner of my invention with an open end tube as tube 30, Figure 3. Runs 3 and 4 were made with premix burners of the prior art. It should be noted that runs 1, 3 and 4 required higher air pressures than any of the non-premix burners herein disclosed.

In Table II are given the results of another series of runs using the same furnace as employed in the runs reported in Table I. The runs reported in Table II were made for the purpose of illustrating the general operation of the tangential burner when varying the number of openings in the gas inlet tube. In this table is also given in feet per second the velocity, calculated at atmospheric pressure of the gas emerging from the holes near the outlet end of the gas inlet tube.

It will be obvious to those skilled in the art that any suitable preheating of the air or fuel gas supplied to the burner can be utilized. Although two tangential inlets with burners are illustrated in Figure 2 it is obvious that any number of tangential inlets can be used as, for example, under some conditions it is desirable to employ only one inlet while in larger furnaces three or even more than three inlets may be employed.

The major points which distinguish my burner over burners of the prior art art, (1) the holes (26 of Fig. 2) number from 2 to 4, preferably 3; (2) the holes are located within 2 inches, preferably within 1 inch of either the orifice 45 of Fig. 2) or the step (inner end of ceramic sleeve 25, also of Figure 2); and (3) the linear velocity of the fuel gas through the holes (26 of Fig. 2) is at least about 1000 feet per second calculated at atmospheric pressure.

The following runs were made to determine the optimum number of holes in the bayonet tube 23 for inlet of fuel gas, using a 12-inch diameter reactor having two 10-inch diameter burner tunnels, the bayonet tube being made from 1-inch pipe:

TABLE III

| Run No. | Holes Number | Holes Diam., in. | Gas Vel., ft. per sec.[1] | Operation of burners |
|---|---|---|---|---|
| 14 [2] | 4 | 5/16 | 1,300 | Smooth and stable combustion.[3] |
| 15 | 5 | 5/16 | 1,050 | Top burner—smooth and stable combustion. Lower burner—ran too cold for use in carbon black process; burner vibrated. |
| 16 | 4 | 5/16 | 1,300 | Smooth and stable combustion.[4] |
| 17 | 6 | 17/64 | 1,200 | Both burners vibrated badly. |
| 18 | 3 | 3/8 | 1,205 | Smooth and stable combustion. |
| 19 | 2 | 29/64 | 1,200 | Do. |

[1] Calculated at atmospheric pressure.
[2] The burner air pressure was 9 in. Hg, the pressure of the furnace effluent in the cooling pipe was 2 in. Hg, pressure drop through burner and furnace was 7 in. Hg.
[3] The four holes in the bayonet tube were flush with the orifice and the burner pressure drop through the burner and furnace was 7 inches of mercury.
[4] The four holes were flush with the step and the step was 4 inches downstream from the orifice.

The following Table IV gives data illustrating operations of my burners as a function of the position of the holes (26, of Figures 2 and 3) with respect to the inner end of the ceramic tube 25 and the orifice 45 (Fig. 2) or the inner end of tube 30 (Fig. 3). From these data it is seen that combustion was smooth when the bayonet tube 23 was so positioned that holes 26 were within 2 inches, preferably within 1 inch, of either the step or the orifice 45.

When the three conditions set forth hereinbefore, i.e., (1) 2 to 4 holes for inlet of fuel, (2) holes located within 2 inches, preferably within 1 inch of either the orifice (or outlet of air tube) or the step, and (3) the linear velocity of the fuel gas through the holes greater than 1000 feet per second (f.p.s.) are met, such other conditions as burner throughput, orifice size and tunnel dimensions have an effect on burner operation. These latter mentioned conditions are interdependent at least to some extent, and it is difficult to place limits on these conditions. However, if combustion is rough, it can be made smooth by exchanging the orifice for a slightly smaller one. As a further guide to successful use of my burner, improved operation is usually obtained when the tunnel is of such size that the tangential air rate is not in excess of about 125 cubic feet per hour per cubic inch volume of tunnel.

TABLE IV

| | Tangential,[1] c.f.h. | | Burner Pres., in. Hg | | Holes in tube 23 | Orifice Diam., inches | Operation |
|---|---|---|---|---|---|---|---|
| | Air | Gas | Upstream | Downstream | | | |
| Run No. 20: 4" diam. reactor Premix burner | 23,440 | 1,560 | 7.3 | 4.5 | | 1½ | Smooth Combustion. |
| Run No. 21: 4" diam. reactor Non-Premix burner | 23,440 | 1,560 | 4.5 | 3.5 | Three 7/64" diam. even with step | 1⅞ | Do. |
| Run No. 22: 6" diam. reactor Premix burner | 60,000 | 4,000 | 10.0 | 7.1 | | 2½ | Do. |
| Run No. 23: 6" diam. Non-Premix burner | 60,000 | 4,000 | 5.8 | 4.7 | Three 11/64" diam. even with step | 3 | Do. |
| Run No. 24: 4" diam. reactor non-Premix burner | gas velocity>1,000 f.p.s. | | | | Three holes 2 inches downstream from step; 5" downstream from orifice. | | Do. |
| Run No. 25: 6" diam. reactor Non-Premix burner | gas velocity>1,000 f.p.s. | | | | Three holes 3 inches downstream from step (6" downstream from orifice). | | Rough Combustion. |
| Run No. 26: 4" diam. reactor non-Premix burner | gas velocity>1,000 f.p.s. | | | | Three 7/64" holes 3 inches downstream from step. | | Unstable Combustion. |

[1] Tangential gas and air for two burners.

Table V illustrates the effect of air volume per cubic inch of tunnel volume on burner operation.

TABLE V

| Run No. | Diam. of Reactor, in. | Tangential[1] Air Rate, c.f.h. | Tangential[1] Gas Rate, c.f.h. | Tunnel Diam., in. | Tunnel Length, in. | Tunnel Vol. cu. in.[2] | Cu. ft. per hour per cu. in. | Operation of burner Combustion |
|---|---|---|---|---|---|---|---|---|
| 27 | 4 | 23,440 | 1,560 | 4.75 | 12.75 | 226 | 55.4 | smooth. |
| 28 | 6 | 60,000 | 4,000 | 6.0 | 12.0 | 340 | 94.1 | Do. |
| 29 | 12 | 185,000 | 12,330 | 10.0 | 12.38 | 971 | 102 | Do. |
| 30 | 12 | 260,000 | 17,330 | 10.0 | 14.13 | 1,110 | 125 | rough. |
| 31 | 12 | 290,000 | 19,330 | 10.0 | 14.13 | 1,110 | 139 | inoperable. |

[1] Tangential air and gas to 2 burners.
[2] The volume of the tunnel was taken as the volume in cubic inches of the tunnel between a plane passing through the holes 26 in bayonet tube 23 and a plane parallel thereto passing through the point of juncture of the wall of the tunnel and of the cylindrical wall of the precombustion chamber 21 nearest the outer end of the ceramic tube 25.

From the observations of the combustion recorded in Table V it is seen that combustion was smooth for all values of cubic feet per hour per cubic inch of tunnel volume less than 125.

In Table VI are given results of six runs using a 4-inch diameter carbon black furnace in which there were three fuel gas inlet holes in the bayonet tube (as hole 26 in tube 23 of Fig. 2). The size of these holes were different for each of these runs. The variations in hole size, with constant volumes of fuel gas, gave markedly different linear gas velocities through the holes which resulted in markedly different burner operation. As mentioned hereinbefore, the burner of my invention operates satisfactorily for carbon black production when the linear velocity of the fuel gas issuing from the holes at or near the end of the bayonet tube is 1000 or more feet per second calculated at atmospheric pressure, and this point is illustrated in the following table. It is also clear that when fuel gas velocity was less than 1000 feet per second combustion is unsatisfactory for good carbon black production. The decrease in burner pressure, as the fuel gas velocity was decreased, also indicated incomplete combustion.

TABLE VI

| 4″ diam. furnace Run No. | Holes in Bayonet tube | | Gas | | Gage Pressure | | | |
|---|---|---|---|---|---|---|---|---|
| | No. | Size, in. | Rate, c.f.h.[1] | Calc'd. vel., f.p.s.[2] | Burner | Precombustion zone | Cooling line | |
| 31 | 3 | 7/64 | 1,560 | 1,110 | 5.0 | 4.3 | 0.7 | satisfactory; good for carbon black production. |
| 32 | 3 | 1/8 | 1,560 | 845 | 4.8 | 4.4 | 0.8 | tunnels colder than in Run 31.[3] |
| 33 | 3 | 9/64 | 1,560 | 670 | 4.8 | 4.5 | 0.8 | top port cold, very slight vibration.[3] |
| 34 | 3 | 5/32 | 1,560 | 543 | 4.8 | 4.3 | 0.9 | cold spots in bottom port.[3] |
| 35 | 3 | 11/64 | 1,560 | 448 | 4.5 | 3.7 | 0.8 | both ports cold.[3] |
| 36 | 3 | 3/16 | 1,560 | 378 | 4.5 | 4.0 | 0.8 | Do.[3] |

[1] Two burners.
[2] Calculated at atmospheric pressure.
[3] Unsatisfactory for carbon black production.

The corresponding end of the air inlet tube 24 (Figure 2) with orifice plate 27 also provides a zone of turbulence with mixing of air and fuel gas when the openings 26 are positioned in the proximity of the downstream side of plate 27. As herein stated, the orifice plate 27 can be eliminated. At times when the orifice plate is eliminated, the entire air inlet tube 24 can also be eliminated. When the orifice tube is eliminated, then for best combustion I use a ceramic sleeve 25 of sufficiently greater wall thickness that the pressure drop of air flowing through the so modified ceramic sleeve is substantially the same as the pressure drop of the air flowing through tube 24 and the orifice 45. Another embodiment involves omission of the ceramic sleeve 25, but in this case the tube 24 and orifice 45 must be used. In other words one of the ceramic sleeve 25 and the tube 24 (and orifice 45) must be used, or both the ceramic sleeve and the tube and orifice can be used.

In positioning the holes 26 near the end of the bayonet tube 23 with respect to the step 25a provided by the end of the ceramic sleeve 25 and with respect to the orifice 45 in the end plate 27 of the air inlet tube 24, the bayonet tube is so positioned that said holes are disposed within about 2 inches, preferably within about 1 inch, of one of said step and said orifice.

In Tables I and II it is seen that for the air ratio shown therein premix burners requires air pressures from 8.0 to 8.5 inches of mercury while the non-premix burners of my invention require air pressures of from about 4.3 to 5.2 inches of mercury for satisfactory operation. Such a difference in air pressure may, at first thought, appear trivial. By averaging pressures from Tables I and II and taking the difference of the average pressures from the runs employing premix and non-premix burners, there is a difference in pressure of about 3½ inches of mercury in favor of the non-premix burners, i.e., the non-premix burners required an average pressure of about 4.5 inches of mercury and the premix burners a pressure of about 8 inches of mercury. This difference in air pressure requirement is about 1¾ pounds per square inch. When considered from the point of view that each carbon black furnace, depending on its size, requires from 23,000 to 125,000 cubic feet of air per hour, or more, considerable saving in power for compressing the air is realized. This saving is further magnified when a carbon black production plant contains from 25 to 100 or more such furnaces.

Although certain process steps, structures and examples have been described for purposes of illustration the invention is clearly not limited thereto. The essence of the invention is that there has been provided a non-premix burner of high combustion stability and low air-pressure requirement. Various modifications are possible within the scope of the disclosure and claims of the invention. The oxidizing gas can be pure oxygen, that is, oxygen of a commercial quality, and oxygen enriched air or air alone, and the fuel gas can be ethane, propane, butane, etc. natural gas or natural gas enriched with one of the preceding hydrocarbons or the fuel gas can be residue gas.

While certain embodiments of the invention have been described for illustrative purposes the invention obviously is not limited thereto.

I claim:

1. A burner assembly comprising, in combination, first, second, third, and fourth conduits, said conduits being disposed along a common axis, said first conduit being disposed within and spaced from said second conduit, one end of said first conduit being closed, said third conduit surrounding said second conduit and said fourth conduit surrounding said third conduit, the outer diameter of said second conduit being about equal to the inner diameter of said third conduit and the outer diameter of said third conduit being about equal to the inner diameter of said fourth conduit, a plurality of circumferentially spaced openings through the wall of said first conduit near its closed end, the end of said second conduit adjacent the closed end of said first conduit being within the end of said third conduit nearest the closed end of said first conduit, said plurality of openings in said first conduit being between the limits of 2 and 4 and being positioned in close proximity axially to the end of one conduit selected from among said second conduit and said third conduit, said second conduit being of uniform cross section throughout its length, the end of said fourth conduit adjacent the aforementioned ends of said first, second and third conduits extending beyond said ends of said second and third conduits and beyond the closed end of said first conduit on the side of said closed end of said first conduit opposite said plurality of openings.

2. In the burner assembly of claim 1 wherein said end of said second conduit is fully open.

3. In the burner assembly of claim 1 wherein said end of said second conduit comprises an orifice plate in such a manner as to restrict flow of fluid therethrough.

4. The burner assembly of claim 1 wherein said plurality of openings is three openings.

5. The burner assembly of claim 1 wherein said close proximity is within about 2 inches.

References Cited in the file of this patent

UNITED STATES PATENTS

| | | |
|---|---|---|
| 1,385,509 | Vance | July 26, 1921 |
| 2,389,027 | Corbin et al. | Nov. 13, 1945 |
| 2,542,750 | Butz | Feb. 20, 1951 |
| 2,564,700 | Krejci | Aug. 21, 1951 |
| 2,780,529 | Wrigley | Feb. 5, 1957 |
| 2,781,250 | Miller | Feb. 12, 1957 |